H. OWEN.
Water Closet.

No. 230,651.

Patented Aug. 3, 1880.

Witnesses
G. P. Redfern

Inventor
Henry Owen

UNITED STATES PATENT OFFICE.

HENRY OWEN, OF LONDON, ENGLAND.

WATER-CLOSET.

SPECIFICATION forming part of Letters Patent No. 230,651, dated August 3, 1880.

Application filed September 18, 1879. Patented in England January 8, 1878.

*To all whom it may concern:*

Be it known that I, HENRY OWEN, of London, England, have invented certain Improvements in Water-Closets, (for which I have received English Letters Patent, dated 8th January, 1878, and sealed 17th May, 1878,) of which the following is a specification.

This invention has for its object improvements in water-closets.

For this purpose I make in earthenware a pan with a trap at the bottom formed by arranging the outlet from the pan to take place through a passage which inclines upward, so that water is always left at the bottom of the pan sufficient to cover the lower end of the outlet-passage. Below this first trap there is a second trap of a similar construction, formed with the pan in one piece, and from the space between the two traps there is an outlet for gases, which is connected with a pipe leading to a ventilating-shaft, or carried outside the wall and provided with a cowl, by which the gases can find free exit. A cleaning-out opening is provided in case of stoppage.

I prefer to mold the pan and two traps with the ventilating-passage all together in one piece of earthenware; but the lower trap may be made separately, (or be entirely dispensed with,) leaving the pan with the upper trap and ventilating-passage molded together in one piece of earthenware to form the closed top.

To make my invention better understood, I will proceed to describe the same by reference to the accompanying drawings, in which—

Figure 1:
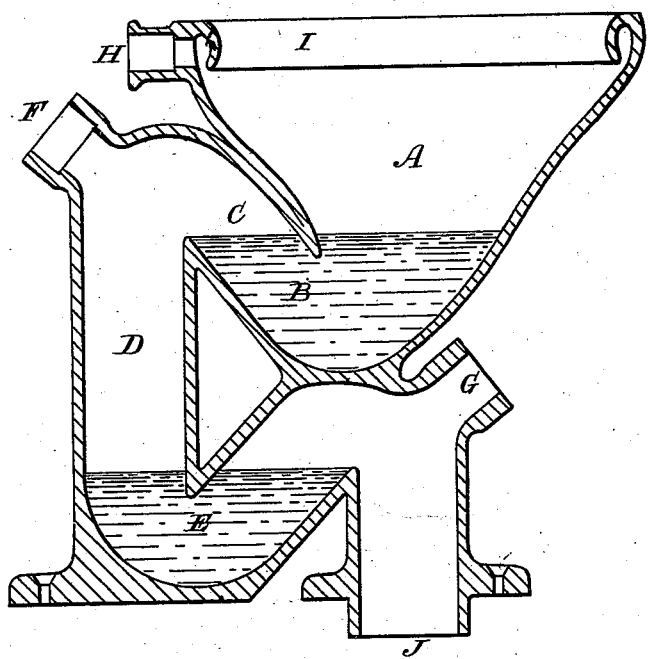
Figure 2:
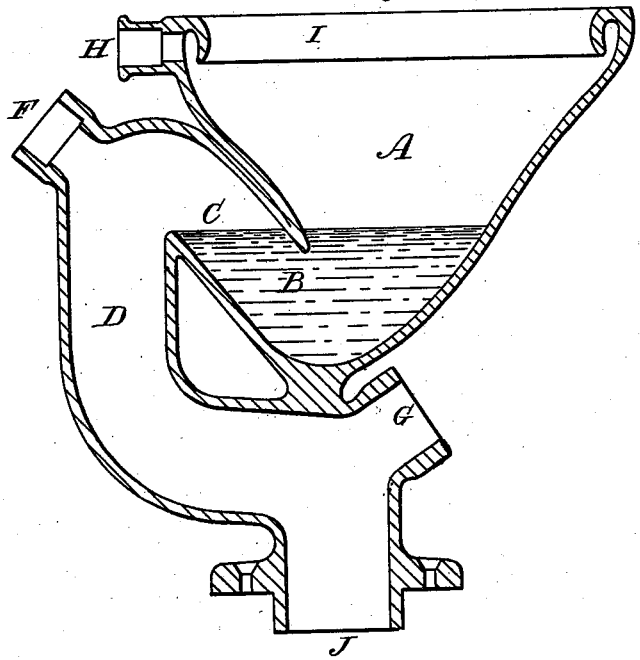

Figure 1 is a section of my improved water-closet with two traps; Fig. 2, section of a similar water-closet with one trap only.

Similar letters in both figures represent similar parts.

A is the pan or basin; B, the trap at the bottom of same, formed by the inclined passage or outlet C from the back. The inclined passage C opens into the vertical passage D at the back, communicating with a second trap, E, similar to the trap B.

F is the outlet for gases. A pipe is connected with this outlet and carried through the wall of the house, and is there connected with the ventilating-shaft or fixed to the wall and capped with a small cowl to prevent downdraft.

G is an inlet-opening, (closed by a suitable air-tight stopper,) placed immediately above the lower trap, E, and in front of the closet; but this inlet G may be dispensed with. This opening allows of easily unstopping the soil-pipe J should it by carelessness become stopped.

H is the inlet for the water for flushing the water-closet, the water being carried around the basin by the hollow oval rim I, and then rushes through the traps.

By this construction of water-closet it will be seen that the pan or basin A forms a perfect trap in itself, and is never empty, whether in use or not, which is also the case with the lower trap, E, while the gases from the soil-pipe J will be carried off through the outlet F by the hereinbefore-described ventilating-shaft or cowl, which will prevent their return. The water in the traps will thus always be kept pure, so that no smell can arise from the water-closet.

The water for flushing the closet, after passing around the oval rim I, will rush through the traps, carrying everything before it; but should the soil-pipe J become stopped from carelessness it can easily be unstopped by means of the inlet G.

Another advantage of my improved water-closet is that it can be made in one piece of earthenware and requires no metal-work whatever in its construction.

Fig. 2 shows a water-closet constructed similarly to that hereinbefore described, and shown in Fig. 1, except that the lower trap is dispensed with.

My improved water-closets, being complete in themselves, can be fixed with great facility and economy.

Having thus described my invention and the manner of performing the same, what I claim is—

1. A water-closet in which the basin is provided with a permanent trap and with an additional trap beneath the basin, the upper trap having an outlet-passage to the lower trap, substantially as described.

2. An earthenware water-closet made in a single piece, and having formed therein the water-inlet H, basin A, trap B, inclined passage C, the passage D and its gas-outlet F at the rear, the cleansing-inlet G at the front, and the outlet J, all as shown and described.

HENRY OWEN.

Witnesses:
G. F. REDFERN,
A. ALBUTT.